United States Patent
Brabec

(10) Patent No.: US 8,358,304 B2
(45) Date of Patent: Jan. 22, 2013

(54) METHOD AND APPARATUS FOR REPRESENTING 3D IMAGE RECORDS IN 2D IMAGES

(75) Inventor: Stefan Brabec, Starnberg (DE)

(73) Assignee: Tomtec Imaging Systems GmbH (DE)

( * ) Notice: Subject to any disclaimer, the term of this patent is extended or adjusted under 35 U.S.C. 154(b) by 978 days.

(21) Appl. No.: 12/303,800

(22) PCT Filed: Feb. 5, 2008

(86) PCT No.: PCT/EP2008/000887
§ 371 (c)(1),
(2), (4) Date: Mar. 2, 2009

(87) PCT Pub. No.: WO2008/101596
PCT Pub. Date: Aug. 28, 2008

(65) Prior Publication Data
US 2011/0181590 A1 Jul. 28, 2011

(30) Foreign Application Priority Data
Feb. 22, 2007 (DE) .......... 10 2007 008 767

(51) Int. Cl.
*G06T 17/00* (2006.01)

(52) U.S. Cl. ........ 345/424; 345/419; 345/427; 345/582; 345/592; 345/629; 345/640; 345/647; 382/154; 348/E13.057

(58) Field of Classification Search .......... 345/419, 345/424, 427, 582, 592, 629, 640, 647; 382/154; 348/E13.057
See application file for complete search history.

(56) References Cited

U.S. PATENT DOCUMENTS

| | | | |
|---|---|---|---|
| 5,598,516 A | 1/1997 | Mori | |
| 5,764,317 A * | 6/1998 | Sadovnik et al. | 349/5 |
| 5,959,631 A | 9/1999 | Knittel | |
| 6,100,895 A | 8/2000 | Miura et al. | |
| 6,334,847 B1 * | 1/2002 | Fenster et al. | 600/443 |
| 6,466,185 B2 * | 10/2002 | Sullivan et al. | 345/6 |
| 6,582,372 B2 * | 6/2003 | Poland | 600/463 |
| 7,924,279 B2 * | 4/2011 | Gerritsen et al. | 345/424 |
| 8,022,951 B2 * | 9/2011 | Zhirkov et al. | 345/427 |
| 2002/0190984 A1 * | 12/2002 | Seiler et al. | 345/424 |
| 2005/0134582 A1 | 6/2005 | Hermann Claus | |
| 2010/0321478 A1 * | 12/2010 | Sliwa et al. | 348/51 |

OTHER PUBLICATIONS

Managuli "Multi-Volume Rendering for Three-Dimensional Power Doppler Imaging". IEEE, 2005.*
Weiskopf et al. "A Depth-Cueing Scheme Based on Linear Transformations in Tristimulus Space". Published 2002.*
International Search Report PCT/EP2008/000887 Dated Sep. 4, 2008.
Daniel Weiskopf, et al., "Real-Time Depth-Cueing beyond Fogging", XP008095696, Journal of Graphics Tools, vol. 7, No. 4, pp. 83-90.
David Ebert, et al., "Volume Illustration: Non-Photorealistic Rendering of Volume Models", Computer Science and Electrical Engineering.

* cited by examiner

*Primary Examiner* — Kimbinh T Nguyen
(74) *Attorney, Agent, or Firm* — Cantor Colburn LLP

(57) ABSTRACT

The invention relates to method and an apparatus for depth cueing, i.e. improving the sense of depth in two-dimensional images of three-dimensional volume data, said 2D images being generated using volume rendering. The invention is characterized in that a second depth color chart generated from the original color chart by permuting at least two color channels is used in the depth dimension. Alternatively, all three color channels can be permuted.

17 Claims, 3 Drawing Sheets
(1 of 3 Drawing Sheet(s) Filed in Color)

| depth color chart | | | |
|---|---|---|---|
| | color channel | | |
| voxel value | R | G | B |
| 1 | 0 | 1 | 2 |
| 2 | 0 | 1 | 3 |
| 3 | 0 | 2 | 4 |
| 4 | 0 | 3 | 5 |
| 5 | 1 | 4 | 6 |
| 6 | 1 | 5 | 8 |
| 7 | 1 | 6 | 9 |
| 8 | 1 | 7 | 10 |
| 9 | 1 | 7 | 12 |
| 10 | 2 | 8 | 13 |
| 11 | 2 | 9 | 14 |
| 12 | 2 | 10 | 15 |
| 13 | 2 | 11 | 16 |
| 14 | 2 | 12 | 27 |
| ... | ... | ... | ... |

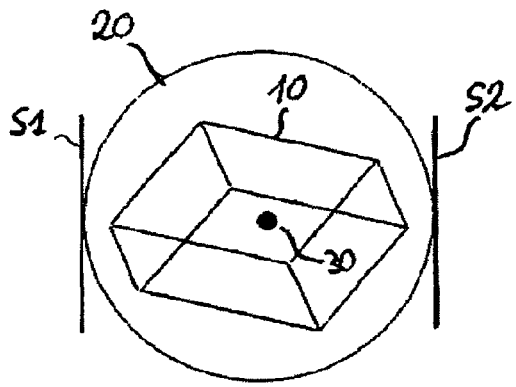
Fig. 7
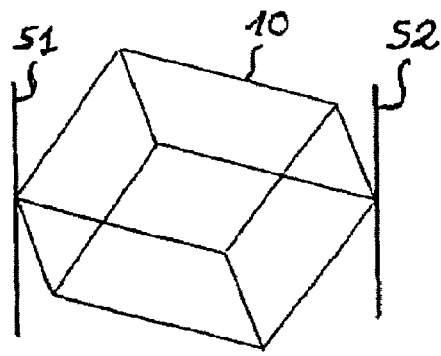
Fig. 6 (State of the art)
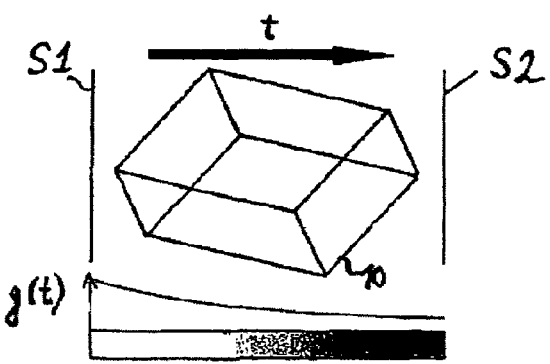
Fig. 1
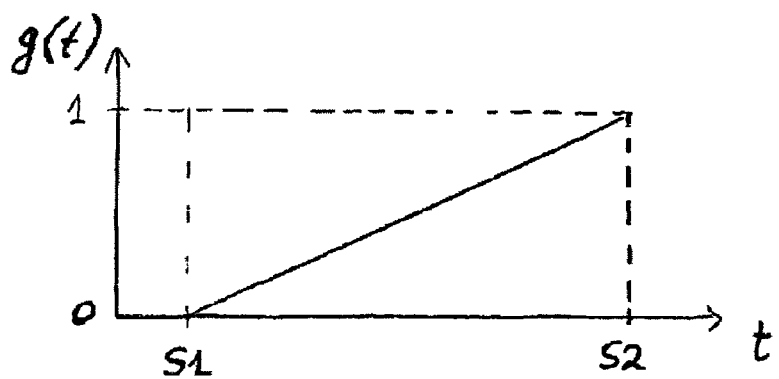
Fig. 2

| original color chart | | | |
|---|---|---|---|
| | color channel | | |
| voxel value | R | G | B |
| 1 | 2 | 1 | 0 |
| 2 | 3 | 1 | 0 |
| 3 | 4 | 2 | 0 |
| 4 | 5 | 3 | 0 |
| 5 | 6 | 4 | 1 |
| 6 | 8 | 5 | 1 |
| 7 | 9 | 6 | 1 |
| 8 | 10 | 7 | 1 |
| 9 | 12 | 7 | 1 |
| 10 | 13 | 8 | 2 |
| 11 | 14 | 9 | 2 |
| 12 | 15 | 10 | 2 |
| 13 | 16 | 11 | 2 |
| 14 | 27 | 12 | 2 |
| ... | ... | ... | ... |

Fig. 3

| depth color chart | | | |
|---|---|---|---|
| | color channel | | |
| voxel value | R | G | B |
| 1 | 0 | 1 | 2 |
| 2 | 0 | 1 | 3 |
| 3 | 0 | 2 | 4 |
| 4 | 0 | 3 | 5 |
| 5 | 1 | 4 | 6 |
| 6 | 1 | 5 | 8 |
| 7 | 1 | 6 | 9 |
| 8 | 1 | 7 | 10 |
| 9 | 1 | 7 | 12 |
| 10 | 2 | 8 | 13 |
| 11 | 2 | 9 | 14 |
| 12 | 2 | 10 | 15 |
| 13 | 2 | 11 | 16 |
| 14 | 2 | 12 | 27 |
| ... | ... | ... | ... |

Fig. 4

| depth color chart | | | |
|---|---|---|---|
| | color channel | | |
| voxel value | R | G | B |
| 1 | 0 | 2 | 1 |
| 2 | 0 | 3 | 1 |
| 3 | 0 | 4 | 2 |
| 4 | 0 | 5 | 3 |
| 5 | 1 | 6 | 4 |
| 6 | 1 | 8 | 5 |
| 7 | 1 | 9 | 6 |
| 8 | 1 | 10 | 7 |
| 9 | 1 | 12 | 7 |
| 10 | 2 | 13 | 8 |
| 11 | 2 | 14 | 9 |
| 12 | 2 | 15 | 10 |
| 13 | 2 | 16 | 11 |
| 14 | 2 | 27 | 12 |
| ... | ... | ... | ... |

Fig. 5

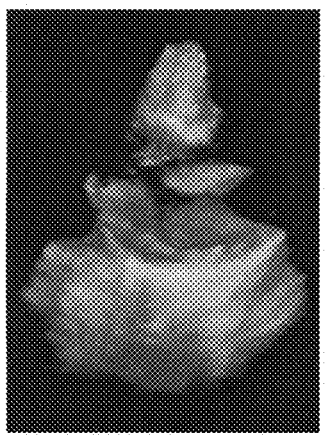
Fig. 8
(state of the art)
Fig. 9
(state of the art)
Fig. 10
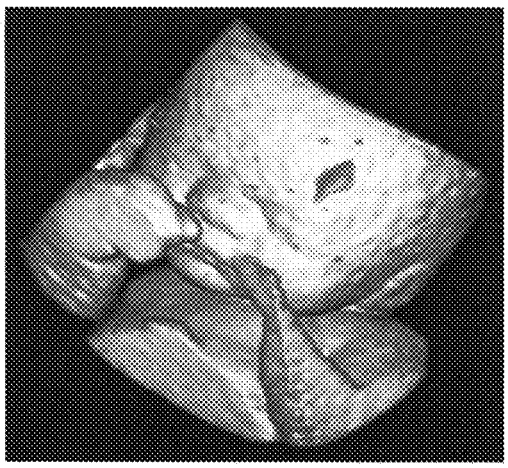
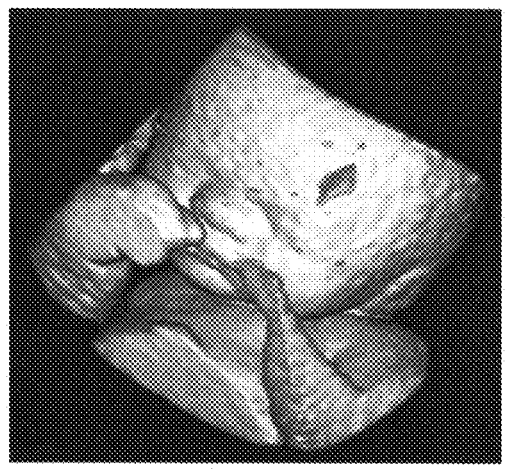
Fig. 11
(state of the art)
Fig. 12

METHOD AND APPARATUS FOR REPRESENTING 3D IMAGE RECORDS IN 2D IMAGES

FIELD OF THE INVENTION

The invention relates to the field of representing three-dimensional (3D) image data sets in two-dimensional (2D) images, and particularly to a method and the apparatus therefor.

BACKGROUND OF THE INVENTION

Medical imaging methods, e.g. ultrasound (US), X-ray techniques, particularly Computed Tomography (CT), Magnetic Resonance Imaging (MRI), or nuclear medical imaging methods such as Positron Emission Tomography (PET) allow for achieving three-dimensional image data sets, also called volumetric data, of the body of human beings as well as animals. This results in the problem how to represent these three-dimensional (3D) data, as typical display devices such as a screen and a printer provide two-dimensional (2D) image planes only. One possibility for representing a three-dimensional (3D) data record is to put a sectional plane through the data record and to represent only those image elements (voxels) of the 3D image data set situated on this sectional plane. By moving the sectional plane or by generating many sectional planes, the medical practitioner is able to visualize a three-dimensional image of the represented object.

Other methods also allow for representing the entire 3D image data set simultaneously. For example, it is possible to generate a 2D image of a three-dimensional ultrasonic image of a fetus which shows the fetus in a digitally generated top view, as shown in FIG. 11, for example. In order to generate such a 2D image, an imaging software extracts from a 3D image data set boundary surfaces between the fetus and the amniotic liquor surrounding the fetus and adds lighting effects and shadows according to a virtual light source. Such a method is called "surface rendering".

It is also possible to represent the entire image data set in a 2D image, when image data sets have boundary surfaces which are not so well defined. In this case, the single voxels of the 3D image volume are classified according to their optical characteristics, for example as transparent or opaque, and then a 2D image is generated from a certain viewing direction, which corresponds to a certain view of the 3D image data set. Such a method is generally called "volume rendering". FIG. 8 shows an example for a 2D image of a 3D ultrasonic image data set of the heart generated by volume rendering.

In German, rendering methods are also called "digitale Bildsynthese" ("digital image synthesis"). The term "rendering" generally relates to a method for generating a 2D image from a 3D description. This may be a 3D image data set, but also a geometric description such as a grid model, an analytic/parametric description such as formulas or algorithms, for example fractals.

In general, and also in this document, "volume rendering" refers to methods for generating a 2D image from a 3D image data set. Preferably, this image gives a certain sense of depth of the 3D image. Surface rendering is a specific variant of volume rendering.

When representing the 2D images generated by rendering, a color representation is often preferred. A color is assigned to each voxel of the 3D image volume or to each pixel of the 2D image, which is determined by means of a voxel value or pixel value listed in a color chart.

While local characteristics (for example surface texture, curvature, etc.) can be represented in a relatively good and efficient way by means of local virtual lighting ("gradient-lighting"), as shown in FIGS. 11 and 8, the sense of depth is lost in many cases. Especially when representing volume records of complicated anatomic regions (for example 3D/4D ultrasonic images), it is often difficult to understand the global positioning.

In the state of the art, methods for improving the sense of depth of 3D image data sets are generally called "depth cueing". Depth cueing refers to a group of effects, which change certain material characteristics or lighting characteristics as a function of the depth relative to the observer in order to achieve a better sense of depth. The so-called "fogging" for instance is commonly applied to make the color of an object fading for example to white or black towards the background. Another method is described in D. Weiskopf, T. Ertl: "Real-Time Depth-Cueing beyond Fogging", Journal of Graphics Tools, Vol. 7, No. 4, 2002. This article proposes to change the color saturation in such a way that in the foreground of the image full color saturation is used, while in the background of the image only shades of grey are used.

The article of D. Ebert, P. Rheingans: "Volume Illustration: Non-Photorealistic Rendering of Volume Data", IEEE Visualization 2000, 2000, proposes to combine intensity-depth cueing with a slight modification of the shade of color. For example, with increasing depth the color can fade to blue, as already practiced by Leonardo da Vinci. Such methods of changing the shade of color with increasing depth of the picture have very different effects according to the predominant color of the picture. If, for example, a color chart already containing a blue gradient was used for generating the picture, a background change to blue is not very efficient and rather irritating.

US 2006/0173326 describes a method of depth cueing of ultrasonic images in which the color of "color-flow" (Doppler) images is changed with increasing distance to the observer in order to give a sense of depth.

Another possibility to generate a sense of depth is perspective foreshortening. However, this is not applicable particularly for anatomic data, because these images are often not clearly arranged and the observer is not able to distinguish between perspective foreshortening and atrophy of the organ observed.

The methods for depth cueing have also major disadvantages: fogging makes the image unclear in greater depth, the contours become blurred "grey-in-grey", and the sense of depth is accompanied by a loss of information.

In summary, the methods of depth cueing have great disadvantages particularly in the field of representation of medical 3D or 4D image data sets. Therefore, the global relations (relative orientation, distance, position, etc.) of the different structures in an anatomic image data set cannot be recognized easily in many cases.

BRIEF SUMMARY OF THE INVENTION

The present invention to provides a new method and an apparatus therefor, which improves the sense of depth of 2D images generated from 3D image data sets.

The 3D image data set according to the invention can be any volumetric data, especially data generated by a medical imaging method such as computed tomography, MRI or ultrasound, but also, for example, geological data or simulated data sets of the field of fluid dynamics. A 3D image data set according to the invention may also be part of a four-dimensional (4D) image data set, the fourth dimension being time.

For example, this could be a 4D ultrasonic record of e.g. the moving heart. The 3D image data set preferably represents a 3D image volume, in which an object to be displayed is represented. Preferably, the object is a part of a human or animal body or a fetus. The 3D image volume preferably consists of discrete volumetric elements (voxels) each representing a sample point (measured value). All measured values together form the image data of the 3D image data set.

A two-dimensional image is generated from said 3D image data set by means of volume rendering, which also comprises surface rendering. First, the viewing direction has to be defined, from which the 3D image data set shall be viewed. This can be done either manually by a user or automatically according to a predetermined viewing direction.

Volume Rendering can be performed according to any method, for example as described in Marc Levay: "Volume Rendering—Display of Surfaces from Volume Data" IEEE Computer Graphics and Applications, Vol. 8, No. 3, May 1988, pp 29-37. For example, the data points are each linearly combined on a ray starting from an observer's point of view. Previous to or during the rendering process a first color value is assigned to each voxel, calculated from the voxel value by using an original color chart. A color value, e.g. an RGB value, is preferably assigned to each possible voxel value by means of an original color chart. A black and white shading is also possible, wherein a grey value is assigned to each voxel value by means of the original color chart.

In order to achieve a color depth cueing, a second color value is assigned to each voxel, which according to a first variant is determined from the voxel value by using a depth color chart, which is generated from the original color chart by permuting at least two color channels. The color value of the voxel used for volume rendering is calculated from the first and the second color value according to a given weighting function depending on the depth of the voxel in the predetermined viewing direction. In other words, for depth cueing an interpolation is made between the original color chart and the depth color chart by means of the weighting function. For objects in the foreground the original color chart is used to a higher degree, and for objects in the background the depth color chart is used to a higher degree. Usually, this is performed during the step of rendering.

Depth of a voxel means a value depending on the distance of the voxel to the virtual observer's point of view, for example the distance to the observer's point of view directly, or the distance to a reference plane situated at the margin of the image volume.

The invention is characterized in that the color values do not fade to any predetermined color with increasing depth but fade to a color calculated from the original color chart by permuting color channels. In other words, the color assigned to depth is always different from the color of the original color chart.

Preferably, the original color chart therefore does not only consist of shades of grey.

If, for example, the original color chart consists of 256 red/green/blue values, it can be represented as follows:

Original color chart OT: (R0, G0, B0) . . . (R255, G255, B255).

The depth color chart may for example be achieved in exchanging the red and the blue channel:

Depth color chart TT: (B0, G0, R0) . . . (B255, G255, R255).

As a result, those pixels represented in a shade of red according to the original color chart would be mixed with blue in the background of the image, while pixels represented in a shade of blue according to the original color chart would be more reddish in the background of the image.

Alternatively, it is also possible to exchange the red and the yellow channel or the blue and the yellow channel.

Preferably, only two color channels are exchanged. However, it is also possible and within the scope of the present invention to permute all three color channels.

The invention not only is applicable to the RGB color space but also to any other way of color representation or to any other color space.

Preferably, the color value of each voxel is calculated by means of the following formulas:

$$g = \text{weighting function}(t) \tag{1}$$

$$\text{color value} = OT(\text{voxel value})*(1-g) + TT(\text{voxel value})*g \tag{2}$$

with t being the depth of the voxel in the viewing direction, OT representing the original color chart and TT representing the depth color chart. By means of the weighting function g(t) an interpolation coefficient in the interval [0; 1] is calculated based on the depth t of a voxel, which thereafter is part of formula (2) as g. The formulas (1) and (2) describe a linear interpolation between the values OT and TT, any other type of interpolation also being possible.

Assigning the second color value to each voxel can be carried out in two alternative ways: First, as described above, an original color chart and a depth color chart can be used.

Alternatively, the second color value can be achieved from the first color value by permuting at least two color channels. The result is similar to that when using a depth color chart, however, the depth color chart is not explicitly calculated but a second color value is determined for each voxel additionally to the first color value by permuting the color channels.

According to a first embodiment, the first color value is assigned to each voxel prior to rendering and the second color value is assigned to each voxel during rendering.

According to a second embodiment, no color values are assigned to the voxels initially, and once the volume rendering starts a first and a second color value are assigned to each voxel. This can be performed during classification of the voxel in the course of volume rendering.

The quality of the depth effect is also influenced by the selection of the weighting function and the determination of the starting and ending planes. Preferably, the weighting function is a function which increases linearly or exponentially from 0 to 1 between a starting plane and an ending plane being vertical to the viewing direction. According to the type of calculation the weighting function can also decrease from 1 to 0. As examples, the weighting function may be exponential, linear or square exponential. Preferably, the starting and ending planes enclose the object to be represented.

Preferably, the starting and ending planes should be as close as possible to the object to be represented, in order to make the depth effects visible especially at the object. Therefore, the starting and ending planes may be set on the outer points of the 3D image data set, in viewing direction.

However, a variant is preferred in which the starting and ending planes are tangential planes of a sphere, which encloses the entire 3D image data set in any viewing direction. This provides the advantage that the distance between starting and ending planes is constant from any viewing direction, and therefore the depth effect does not change according to the different viewing directions.

Preferably, the voxel values of the 3D image volume are scalar values. However, the invention is also applicable to 3D image volumes of vectors, for example 3D image volumes containing color Doppler ("color Doppler/Flow") data acquired by using ultrasound.

The representation of depth effects according to the invention can also be applied to an already calculated 2D image with additional depth information. The 2D image was generated from a 3D image data set using volume rendering, a mean depth of the voxel represented in this pixel being assigned to each pixel of the 2D image, as well as a first pixel color value (taken from the original color chart, i.e. without depth effects).

Thereafter, a depth-weighted pixel color value is calculated for each pixel of the 2D image, a second pixel color value being achieved from the first pixel color value by permuting at least two color channels and the depth weighted pixel color value being calculated by means of a given weighting function depending on the mean depth of the pixels.

This method is particularly useful for images generated by surface rendering, in which a mean depth can be assigned relatively precisely to each pixel.

According to a preferred embodiment, the method according to the invention can be combined with other depth cueing methods. For example, besides the color also the intensity and/or the saturation of the color can be changed with increasing depth. For example, these methods can be carried out according to the article of D. Weiskopf and T. Ertl "Real-Time Depth-Cueing beyond Fogging", Journal of Graphics Tools, Vol. 7, No. 4, 2002.

The invention also is directed to a corresponding apparatus for representing 3D image data sets in 2D images. The apparatus comprises:

Preferably, the apparatus is suitable for performing the method described above. More preferred, the apparatus is integrated into a medical ultrasonic device.

Finally, the invention is directed to a digital storage medium with software code which induces a computer to perform the above-mentioned method once the software code is installed on the computer.

BRIEF DESCRIPTION OF THE FIGURES

The patent or application file contains at least one drawing executed in color. Copies of this patent or patent application publication with color drawings will be provided by the Office upon request and payment of the necessary fee.

FIG. 1 is a schematic representation of a 3D image volume 10 with the weighting function g(t), FIG. 2 is an example of a weighting function g(t);

FIG. 3 is an example of an original color chart;

FIG. 4 is an example of a first depth color chart;

FIG. 5 is a second example of a depth color chart;

FIG. 6 is a perspective view of a 3D image volume 10 with starting and ending planes according to the state of the art;

FIG. 7 is a perspective representation of a 3D image volume with starting and ending planes according to an embodiment of the invention;

FIG. 8 is an example of an ultrasonic image generated by volume rendering without depth cueing;

FIG. 9 is the image of FIG. 8, but with depth cueing according to the state of the art;

FIG. 10 is the image of FIG. 8, but with depth cueing according to an embodiment of the invention;

FIG. 11 is an ultrasonic image of a human fetus generated by using surface rendering without depth cueing;

FIG. 12 is the image of FIG. 11, but with depth cueing according to an exemplary embodiment of the invention.

DETAILED DESCRIPTION OF THE PREFERRED EMBODIMENTS

FIG. 1 demonstrates the principles of depth cueing: A 3D image volume is rendered in a viewing direction t. For the representation of depth effects, a weighting function g(t) is used which, in this example, decreases exponentially. Furthermore, a starting plane S1 and an ending plane S2 are defined, which enclose the 3D image volume 10 and thus define the region where the impression of depth shall be generated. According to another embodiment, the weighting function g(t) may increase linearly between the starting and ending planes S1 and S2, as is represented in FIG. 2. The type of weighting function determines whether the depth effects shall be clearly visible only in greater depth or whether depth effects shall be recognizable already in the foreground.

FIGS. 3 to 5 represent two examples of permuting an original color chart. FIG. 3 shows an exemplary original color chart which assigns a color value for each of the three color channels R, G and B to each voxel value having, for example, values between 1 and 128 or 1 and 256. In the depicted example the original color chart is dominated by the R channel and G channel, which means that the voxels are colored yellow (the combination of red and green in the additive RGB color model, which for example is used for monitors, results in yellow).

Now, FIG. 4 shows a depth color chart generated from the original color chart by permuting the R channel and the B channel. The depth color chart therefore is dominated by shades of green and blue. This means that the image colored in shades of yellow according to the original color chart fades to shades of cyan/blue in the background. Therefore, the depth effects are clearly recognizable.

FIG. 5 shows another example of a depth color chart, in which all three color channels R, G and B were permuted. A permutation of all three color channels provides the advantage that any imaginable original color chart results in an evidently distinct depth color chart. Both permutations RGB→BRG and RGB→GBR can be chosen.

FIGS. 6 and 7 show the preferred positioning of the starting and ending planes. According to FIG. 6, the planes S1 and S2 are situated at the outermost points of the 3D image volume 10 in the viewing direction. This results in maximum depth effects, but it presents the disadvantage that the starting and ending planes S1 and S2 have different distances to one another in different viewing directions. If, for instance, the object is rotated, also the planes S1 and S2 change and this results in a serious variation of the color impression.

For this reason it is preferably proposed to define the planes S1 and S2 by means of a so-called "bounding sphere" 20, i.e. a sphere which encompasses the entire 3D image volume 10. With the tangential planes remaining the same when rotated around the center of gravity, also the positions of the starting plane S1 and the ending plane S2 are kept. Within these two planes the weighting functions g(t) mentioned above can be defined.

In case the starting and ending planes are flat planes, as is represented in FIGS. 1, 7 and 8, the depth t of the voxel in the viewing direction preferably is determined by the vertical distance between the voxel and the starting plane. This means that the "viewing rays" used for measuring the depth t of a voxel are all in parallel between the starting and the ending plane (indicated by arrow t in FIG. 1). Therefore, the depth t is calculated by the distance to the starting plane and not by the real distance to a virtual observer's point of view.

Alternatively, the depth t of the voxel can also be determined by the real distance to a virtual observer's point of view. The "viewing rays" in this case are rays diverging from the observer's point of view. In this case, sphere-like bended planes intersected vertically by the diverging viewing rays can be used instead of the flat starting and ending planes S1 and S2.

FIGS. 8 to 10 each show a 2D image generated from a three-dimensional ultrasonic record by volume rendering. In FIG. 8 no depth cueing was used, while in FIG. 9, when generated, a known depth cueing method was used, in which the colors are mixed with black with increasing depth. As can be seen in FIG. 9, a sense of depth is generated in this way, but the image gets blurred with the background. In other words, image information is lost. In FIG. 10, however, a depth color chart according to an exemplary embodiment of the invention generated by permuting the original color chart was used. The yellowish colors of the original color chart are mixed with blue in the background, which is both clearly visible and also gives a suitable sense of depth.

FIGS. 11 and 12 each show a 2D image of a 3D ultrasonic image data set of a human fetus generated by surface rendering. In FIG. 11, again no depth cueing was used, while in FIG. 12 a depth cueing method according to an exemplary embodiment of the invention was used.

The invention claimed is:

1. A method for representing 3D image data sets in 2D images comprising the following steps:
   generating with an imaging device a 3D image data set of a 3D image volume, wherein the 3D image data set comprises voxel values each being assigned to a certain voxel in the 3D image volume;
   defining with a computer a viewing direction used for generating the 2D image from the 3D image data set;
   assigning with the computer a first color value to each voxel, wherein the first color value is determined from the voxel value by using an original color chart;
   assigning with the computer a second color value to each voxel, wherein the second color value is determined from the voxel value by using a depth color chart generated from the original color chart by permuting at least two color channels or wherein the second color value is determined from the first color value by permuting at least two color channels; and
   generating the 2D image from the 3D image data set by using a volume rendering method, wherein a color value of the voxel used for volume rendering is calculated from the first and the second color value by means of a given weighting function depending on a depth of the voxel in the defined viewing direction.

2. The method according to claim 1, wherein said first color value is assigned to each voxel previous to volume rendering and said second color value is assigned to each voxel during volume rendering.

3. The method according to claim 1, wherein the first color value as well as the second color value are assigned to each voxel during volume rendering.

4. The method according to claim 1, wherein the depth color chart is generated from the original color chart by permuting three color channels, or the second color value is generated from the first color value by permuting three color channels.

5. The method according to claim 1, wherein the weighting function is a function increasing linearly or exponentially from 0 to 1 between a starting plane and an ending plane which are substantially vertical to the viewing direction.

6. The method according to claim 1, wherein a color value of each voxel is calculated according to the following formulas:

$$g = \text{weighting function}(t) \quad (1)$$

$$\text{color value} = OT(\text{voxel value}) \ast (1-g) + TT(\text{voxel value}) \ast g \quad (2)$$

wherein t is the depth of the voxel in the viewing direction, $OT$ represents the original color chart and $TT$ represents the depth color chart.

7. The method according to claim 1, wherein an intensity and/or saturation of the color value of each voxel used for volume rendering further decreases with increasing depth of the voxel.

8. A method for representing 3D image data sets in 2D images comprising the following steps:
   providing by a computer a 2D image generated from a 3D image data set of a 3D image volume by volume rendering, wherein a first pixel color value and a mean depth of the voxels represented in this pixel are assigned to each pixel of the 2D image;
   calculating by the computer a depth weighted pixel color value for each pixel of the 2D image, wherein a second pixel color value is determined from the first pixel color value by permuting at least two color channels, and the depth weighted pixel color value is calculated from the first and the second pixel color value according to the mean depth of the pixel by means of a given weighting function.

9. The method according to claim 1, wherein the volume rendering method includes a surface rendering method.

10. The method according to claim 1, wherein the voxel values are scalar values.

11. The method according to claim 1, wherein the weighting function has a value 0 in a starting plane and has a value 1 in an ending plane, the starting and ending planes being vertical to the viewing direction, wherein the starting and ending planes are tangential planes of a sphere including the entire 3D image volume in any viewing direction.

12. The method according to claim 1, wherein the 3D image data set is generated by a medical imaging method and represents a part of the human or animal body or a fetus.

13. The method according to claim 12, wherein the 3D image data set is generated by means of ultrasonic imaging.

14. An apparatus for representing 3D image data sets in 2D images, comprising:
   a first data storage with a 3D image data set of a 3D image volume, wherein the 3D image data set comprises voxel values each assigned to a certain voxel in the 3D image volume;
   a screen for displaying the 2D image generated from the 3D image data set;
   at least one input device enabling the observer to define a viewing direction used for generating a 2D image from the 3D image data set;
   computing means for performing the steps comprising:
      generating the 2D image from the 3D image data set in the defined viewing direction by using volume rendering;
      determining a first color value from the voxel value by using an original color chart assigned to each voxel;
      determining a second color value from the voxel value either by using a depth color chart generated from the original color chart by permuting at least two color channels, or from the first voxel value by permuting at least two color channels; and calculating a color value used for volume rendering from the first and the second color value by means of a given weighting function depending on the depth of the voxel in the defined viewing direction.

15. The apparatus according to claim 14, wherein a color value of each voxel is calculated according to the following formulas:

$$g = \text{weighting function}(t) \quad (1)$$

$$\text{color value} = OT(\text{voxel value})*(1-g) + TT(\text{voxel value})*g \quad (2)$$

wherein t is the depth of the voxel in the viewing direction, OT represents the original color chart and TT represents the depth color chart.

16. A medical ultrasonic device comprising an apparatus according to claim 14.

17. Digital storage medium with software code, wherein the software code induces the computer to perform the method of claim 1 once the software code is installed on the computer.

* * * * *